United States Patent
Huang et al.

(10) Patent No.: US 8,579,242 B2
(45) Date of Patent: Nov. 12, 2013

(54) ELEVATING MECHANISM FOR PROJECTION APPARATUS

(75) Inventors: Chien-Chang Huang, Hsinchu (TW); Fan-Chieh Chang, Hsinchu (TW)

(73) Assignee: Coretronic Corporation, Hsin-chu (TW)

( * ) Notice: Subject to any disclaimer, the term of this patent is extended or adjusted under 35 U.S.C. 154(b) by 64 days.

(21) Appl. No.: 13/211,836

(22) Filed: Aug. 17, 2011

(65) Prior Publication Data

US 2012/0132765 A1    May 31, 2012

(30) Foreign Application Priority Data

Nov. 26, 2010 (CN) .......................... 2010 1 0564059

(51) Int. Cl.
| | | |
|---|---|---|
| F16M 11/20 | (2006.01) | |
| F16M 11/24 | (2006.01) | |
| F16M 11/26 | (2006.01) | |
| F16M 11/00 | (2006.01) | |
| F16M 13/00 | (2006.01) | |
| G03B 21/14 | (2006.01) | |
| G03B 21/22 | (2006.01) | |

(52) U.S. Cl.
USPC ............... 248/188.2; 248/188.1; 248/188.4; 248/188.5; 248/157; 248/423; 248/188.8; 248/649; 248/650; 248/677; 248/354.3; 248/407; 248/408; 248/409; 248/161; 248/406.1; 353/69; 353/70; 353/119

(58) Field of Classification Search
USPC ............ 248/188.2, 188.4, 188.5, 188.1, 157, 248/423, 188.8, 649, 650, 677, 354.3, 407, 248/408, 409, 161, 406.1, 188, 656, 655, 248/669, 616; 353/69, 70, 119
See application file for complete search history.

(56) References Cited

U.S. PATENT DOCUMENTS

| | | | |
|---|---|---|---|
| 4,813,638 A | | 3/1989 | Garcia |
| 5,881,979 A | * | 3/1999 | Rozier et al. ............... 248/188.5 |
| 6,302,543 B1 | * | 10/2001 | Arai et al. ....................... 353/70 |
| 6,871,826 B2 | * | 3/2005 | Oyama et al. ............. 248/188.8 |
| 7,111,948 B2 | * | 9/2006 | Lee et al. ....................... 353/119 |
| 7,198,238 B2 | * | 4/2007 | Inoue .......................... 248/188.4 |
| 7,234,676 B2 | * | 6/2007 | Chen et al. .................... 248/677 |
| 7,442,161 B2 | * | 10/2008 | Gainer ............................ 353/70 |
| 7,475,996 B2 | * | 1/2009 | Hsu et al. ........................ 353/70 |

(Continued)

FOREIGN PATENT DOCUMENTS

| | | |
|---|---|---|
| CN | 101620369 | 1/2010 |
| CN | 101726981 | 6/2010 |
| EP | 1479963 | 11/2004 |
| TW | I231884 | 5/2005 |
| TW | M281198 | 11/2005 |
| TW | I286261 | 9/2007 |

(Continued)

*Primary Examiner* — Terrell McKinnon
*Assistant Examiner* — Christopher Garft
(74) *Attorney, Agent, or Firm* — Muncy, Geissler, Olds & Lowe, PLLC

(57) ABSTRACT

An elevating mechanism for a projection apparatus includes a bottom cover, a resetting element having a first elastic member, a sliding mount, a screw stud sleeve, a screw stud, and a second elastic member. The sliding mount is disposed on a first side of the bottom cover and leans against the resetting element, and the sliding mount has an opening, at least one slot and a thread structure. The screw stud sleeve has a plurality of engaging teeth engaging within the slot. The screw stud has a thread structure and the thread structure of the screw stud meshes with the thread structure of the sliding mount.

8 Claims, 7 Drawing Sheets

(56) References Cited

U.S. PATENT DOCUMENTS

| | | | |
|---|---|---|---|
| 7,780,127 B2 * | 8/2010 | Chou | 248/188.2 |
| 8,057,050 B2 * | 11/2011 | Ruan | 353/70 |
| 2002/0139909 A1 * | 10/2002 | Oyama et al. | 248/188.8 |
| 2003/0106972 A1 * | 6/2003 | Hsu et al. | 248/188.2 |
| 2005/0263663 A1 * | 12/2005 | Inoue | 248/354.1 |
| 2006/0202095 A1 * | 9/2006 | Shao et al. | 248/188.2 |
| 2010/0002203 A1 * | 1/2010 | Ruan | 353/119 |

FOREIGN PATENT DOCUMENTS

| | | |
|---|---|---|
| TW | 200905357 | 2/2009 |
| TW | I312439 | 7/2009 |
| TW | I319115 | 1/2010 |

* cited by examiner

ELEVATING MECHANISM FOR PROJECTION APPARATUS

BACKGROUND OF THE INVENTION a. Field of the Invention

The invention relates to an elevating mechanism for a projection apparatus.

b. Description of the Related Art

Referring to FIG. 1, typically, in order to adjust the position of an image projected from a projection apparatus 100, designers commonly equip the projection apparatus 100 with an elevating mechanism 102. The image is projected onto a screen 104 at a proper position by adjusting an angle of elevation θ of the projection apparatus 100 (or the height of a front end of the projection apparatus 100) through the elevating mechanism 102. More specifically, the elevating mechanism 102 is capable of lifting the front end of the projection apparatus 100 to change the height of the image projected from the projection apparatus 100.

FIG. 2A and FIG. 2B show schematic diagrams of an elevating mechanism 200 disclosed in Taiwan patent no. I286261. Referring to FIG. 2A, a moveable leg 220 is retracted in a base 210 before the height adjustment is performed. Further, a positioning part (not shown) of a frame 252 is inserted into a positioning slot 222 of the moveable leg 220 to fix the moveable leg 220 on the base 210. Referring to FIG. 2B, when a user pushes the button 254, the positioning part of the frame 252 leaves the positioning slot 222, and hence the movable leg 220 moves downwardly and sticks out from the opening 216 of the base 210 by the elastic force of a spring 234. When the movable leg 220 stretches to a proper position, the user may release the button 254 to enable an elastic body (not shown) to push the frame 252, so that the positioning part of the frame 252 may insert the slot 222 of the movable leg 220 to fix the movable leg 220 on the base 210 again.

However, according to the above design, though the movable leg 220 may rise and fall rapidly, the height of the movable leg 220 fails to be finely tuned. Therefore, the accuracy of the height adjustment for the projection apparatus cannot be further improved. Further, Taiwan patent no. M281198 discloses a position adjustment device of a projector having a main body, a stop pin, at least one elastic member and a support screw. When the stop pin is pushed inwardly, a part of the stop pin comes off threads of the support screw to enable the main body to move upwardly and downwardly. Besides, Taiwan patent no. I312439 discloses a projection apparatus having a projection body, a support and a pivoting element. The pivoting element is pivoted on the projection body, and thus the projection body is suitable for swinging over the pivoting element. Therefore, a user is able to rapidly adjust an elevating angle or an inclination of the projection body. In addition, Taiwan design patent no. D100458 discloses a profile of a foot pad for a projection apparatus.

BRIEF SUMMARY OF THE INVENTION

The invention provides an elevating mechanism for a projection apparatus. The elevating mechanism has at least one of the advantages of rapid elevating, high accuracy, convenient storage and smooth release.

Other objects and advantages of the invention may be further illustrated by the technical features broadly embodied and described as follows.

In order to achieve one or a portion of or all of the objects or other objects, one embodiment of the invention provides an elevating mechanism for a projection apparatus including a bottom cover, a resetting element having a first elastic member, a sliding mount, a screw stud sleeve, a screw stud, and a second elastic member. The bottom cover has a through hole, the resetting element is disposed on a first side of the bottom cover, and the first elastic member is formed on one end of the resetting element. The sliding mount is disposed on the first side of the bottom cover and leans against the resetting element, and the sliding mount has an opening, at least one slot and a thread structure. The screw stud sleeve is inserted into the through hole and the opening and is slidably coupled to the bottom cover, and the screw stud sleeve has a plurality of engaging teeth engaging with the slot. The screw stud is accommodated in the screw stud sleeve and has a thread structure, and the thread structure of the screw stud meshes with the thread structure of the sliding mount. One end of the second elastic member is connected with the screw stud sleeve, and another end of the second elastic member is connected with the bottom cover. When the sliding mount is forced to compress the first elastic member, the engaging teeth come off the slot and the thread structure of the screw stud comes off the thread structure of the sliding mount to enable the screw stud and the screw stud sleeve to move in a first direction.

In one embodiment, a rotatable foot pad is connected with one end of the screw stud, and the rotatable foot pad is rotated to enable the screw stud and the screw stud sleeve to move in a first direction or a second direction opposite the first direction.

In one embodiment, a decelerating element is disposed on the first side of the bottom cover and capable of adjusting the speed of the screw stud and the screw stud sleeve moving in the first direction.

In one embodiment, the decelerating element has an elastic sheet, and the elastic sheet rubs against the screw stud sleeve when the screw stud sleeve moves.

In one embodiment, the second elastic member includes a spring, the screw stud sleeve has at least one first hook structure, the bottom cover has at least one second hook structure, one end of the spring is connected with the first hook structure, and another end of the spring is connected with the second hook structure.

In one embodiment, the sliding mount has a base part and a force-exertion part. The slot, the thread structure and the opening of the sliding mount are formed on the base part, and the force-exertion part forms an angle with the base part. For example, the force-exertion part may form an angle of 90 degrees with the base part to allow a user to easily press the force-exertion part.

In one embodiment, the slot and the thread structure of the sliding mount are formed on the periphery of the opening.

The embodiment or the embodiments of the invention may have at least one of the following advantages. According to the above embodiments, the sliding mount cooperates with the resetting element to enable the screw stud sleeve and the screw stud to rapidly reach a preliminary position, and then the height of a front end of a projection apparatus is accurately and rapidly adjusted through the fine tune of the rotatable foot pad. Besides, when one stops using the projection apparatus, one may simply presses the sliding mount to force the screw stud and the screw stud sleeve to return to their original positions. Therefore, the operation for storing the elevating mechanism inside the projection apparatus is quite simple and convenient. Further, the decelerating element may continually rub against the screw stud sleeve to reduce the falling speed of the screw stud and the screw stud sleeve and thus smooth the release of the elevating mechanism.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the teens "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
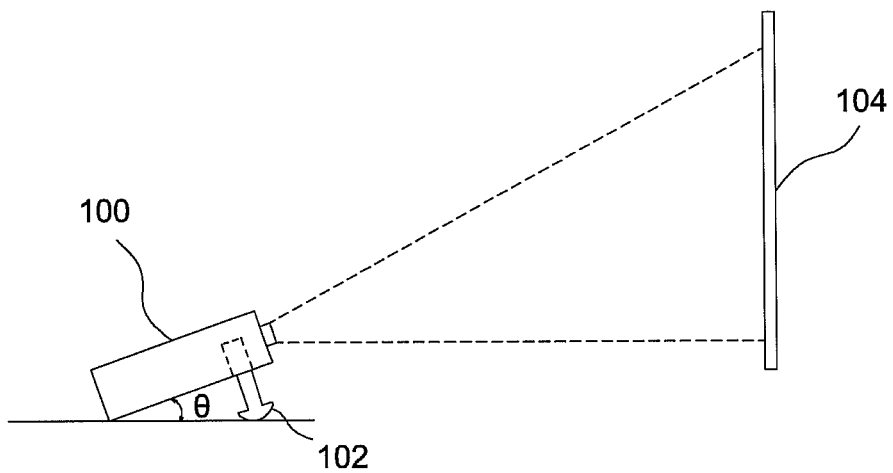
FIG. 1 shows a schematic diagram illustrating a height adjustment to a conventional projection apparatus.
Figure 2A:
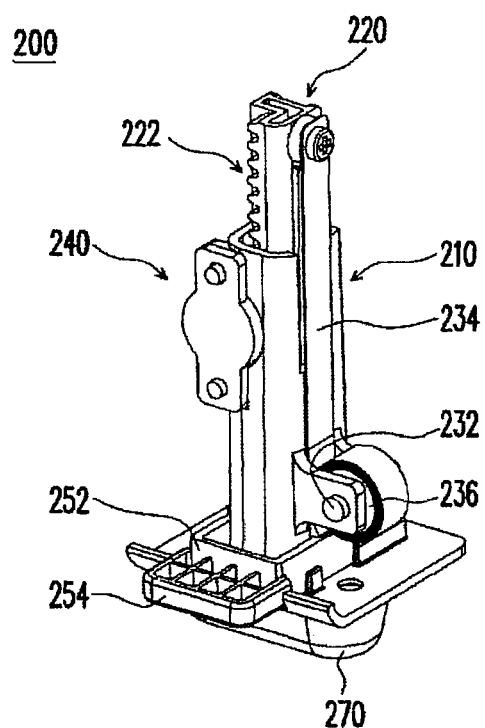
FIG. 2A and FIG. 2B show schematic diagrams of a conventional elevating mechanism.
Figure 2B:
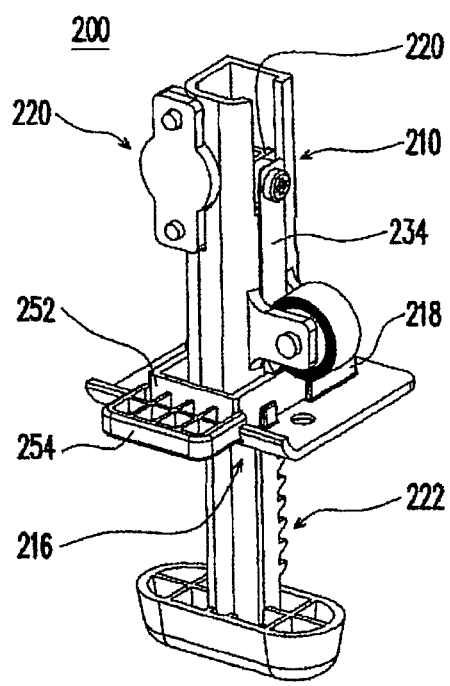
Figure 3:
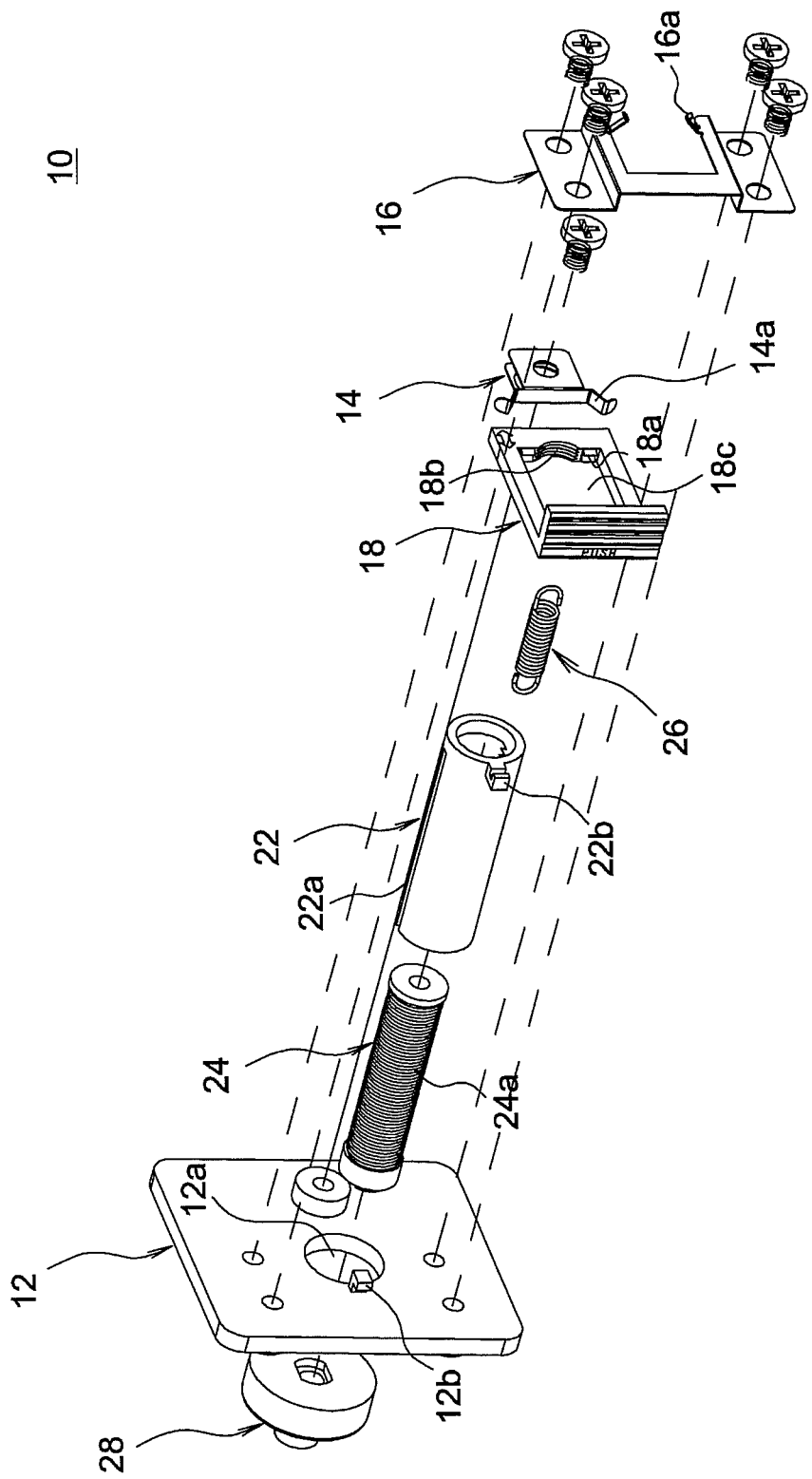
FIG. 3 shows an explosion diagram of an elevating mechanism for a projection apparatus according to an embodiment of the invention.
Figure 4:
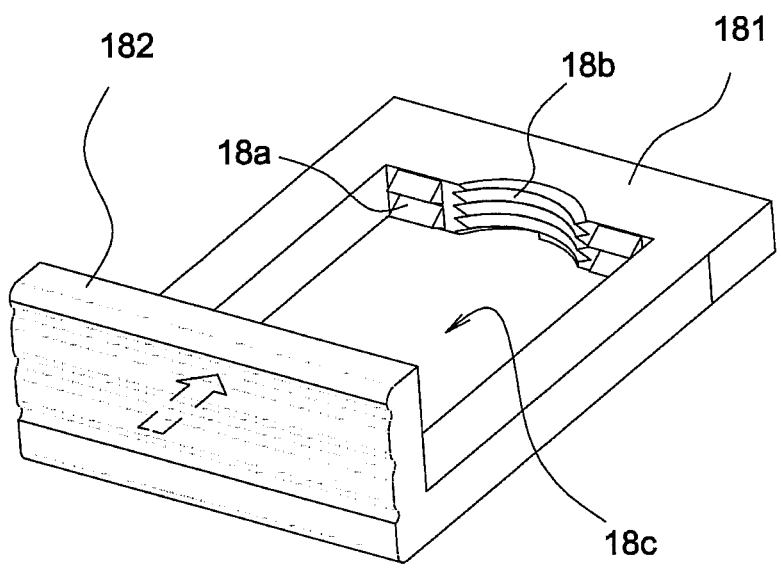
FIG. 4 to FIG. 8 show schematic diagrams illustrating operations of a elevating mechanism according to an embodiment of the invention.

FIG. 3 shows an explosion diagram of an elevating mechanism for a projection apparatus according to an embodiment of the invention. Referring to FIG. 3, an elevating mechanism 10 includes a bottom cover 12, a resetting element 14, a decelerating element 16, a sliding mount 18, a screw stud sleeve 22, a screw stud 24, a spring 26 and a rotatable foot pad 28. The bottom cover 12 has a through hole 12a and at least one hook structure 12b. The resetting element 14 is disposed on a first side of the bottom cover 12, and at least one elastic sheet 14a is formed on one end of the resetting element 14. The sliding mount 18 has at least one slot 18a, a thread structure 18b and an opening 18c. The screw stud sleeve 22 has a plurality of engaging teeth 22a and at least one hook structure 22b. The screw stud 24 has a thread structure 24a, and the rotatable foot pad 28 is connected with one end of the screw stud 24. The decelerating element 16 is disposed and screwed on the bottom cover 12 and has at least one elastic sheet 16a. The decelerating element 16 and the resetting element 14 are disposed on the same side of the bottom cover 12. As shown in FIG. 4, the sliding mount 18 has a base part 181 and a force-exertion part 182 forming an angle with the base part 181. For example, the force-exertion part 182 may form an angle of 90 degrees with the base part 181 to allow a user to easily press the force-exertion part. The slot 18a, the thread structure 18b and the opening 18c are formed on the base part 181, and the slot 18a and the thread structure 18b are formed on the periphery of the opening 18c.

During assembly, the sliding mount 18 is disposed on the first side of the bottom cover 12, and one end of the sliding mount 18 leans against the elastic sheet 14a of the resetting element 14. The screw stud sleeve 22 is inserted into the through hole 12a of the bottom cover 12 and the opening 18c of the sliding mount 18 and slidably coupled to the bottom cover 12. Besides, the engaging teeth 22a of the screw stud sleeve 22 engage with the slot 18a of the sliding mount 18. The screw stud sleeve 22 accommodates the screw stud 24, and the thread structure 24a of the screw stud 24 meshes with the thread structure 18b of the sliding mount 18. One end of the spring 26 is connected with the hook structure 22b of the screw stud sleeve 22, and another end of the spring 26 is connected with the hook structure 12b of the bottom cover 12.

Figure 5:
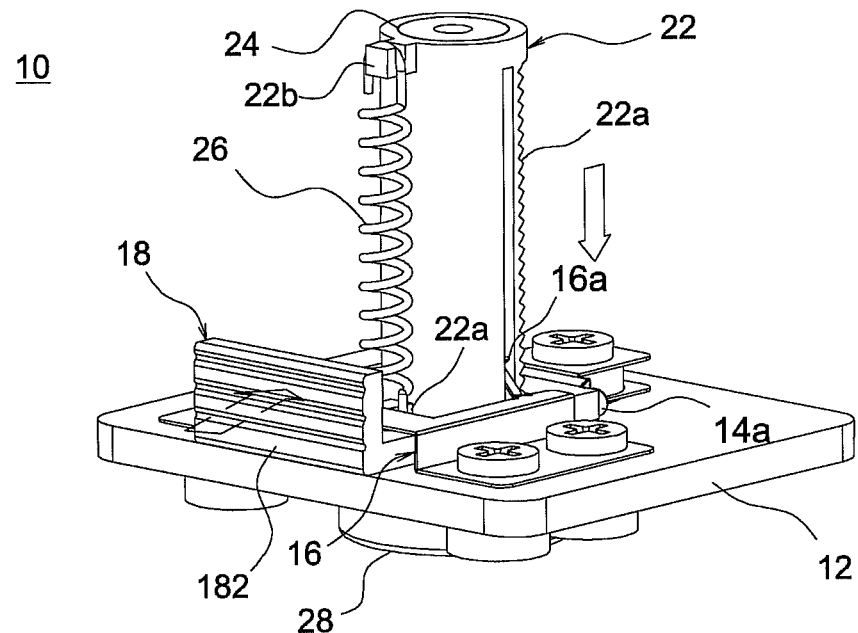
Figure 6:
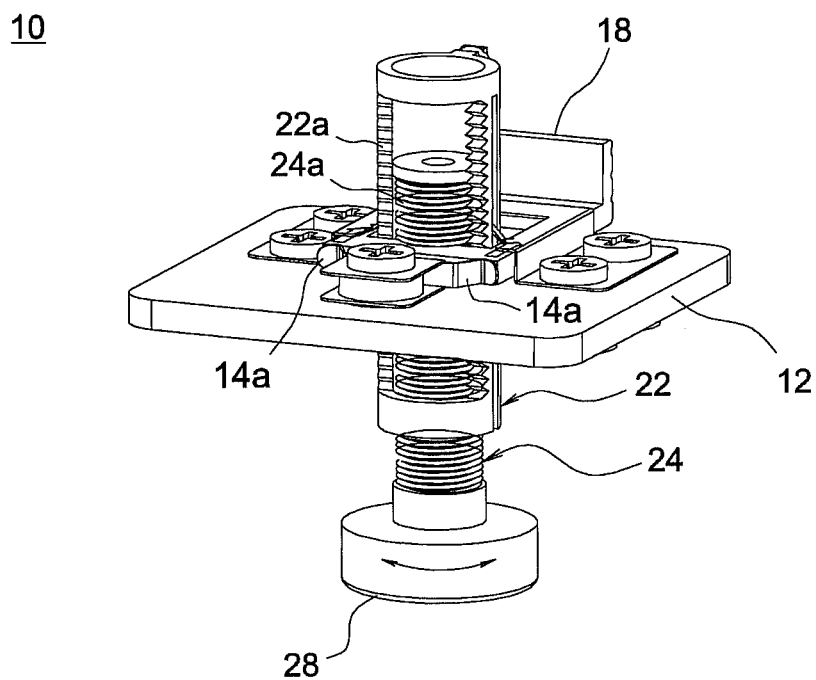

Referring to both FIG. 3 and FIG. 5, when one presses the force-exertion part 182 of the sliding mount 18 to push the entire sliding mount 18, the sliding mount 18 compresses the elastic sheet 14a of the resetting element 14, and meanwhile the engaging teeth 22a of the screw stud sleeve 22 and the thread structure 24a of the screw stud 24 respectively come off the slot 18a and the thread structure 18b of the sliding mount 18. At the same time, the screw stud sleeve 22 and the screw stud 24 rapidly fall down as a result of the elastic force of the spring 26. Further, during the falling process of the screw stud sleeve 22 and the screw stud 24, the elastic sheet 16a of the decelerating element 16 continually rubs against the screw stud sleeve 22 to decrease the falling speed of the screw stud 24 and the screw stud sleeve 22 and thus smooth the falling of the screw stud sleeve 22 and the screw stud 24. Then, as shown in FIG. 6, when the screw stud sleeve 22 and the screw stud 24 fall to a proper position or on a desktop, one may withdraw his hand from the sliding mount 18 to enable the sliding mount 18 to return to an original position with the aid of the elastic force of the elastic sheet 14a. Meanwhile, the engaging teeth 22a of the screw stud sleeve 22 engages with the slot 18a of the sliding mount 18 again, and the thread structure 24a of the screw stud 24 meshes with the thread structure 18b of the sliding mount 18 again. In that case, one may rotate the rotatable foot pad 28 to lift or lower the screw stud 24 and the screw stud sleeve 22 to finely tune the height of the projection apparatus (not shown).

Figure 7:
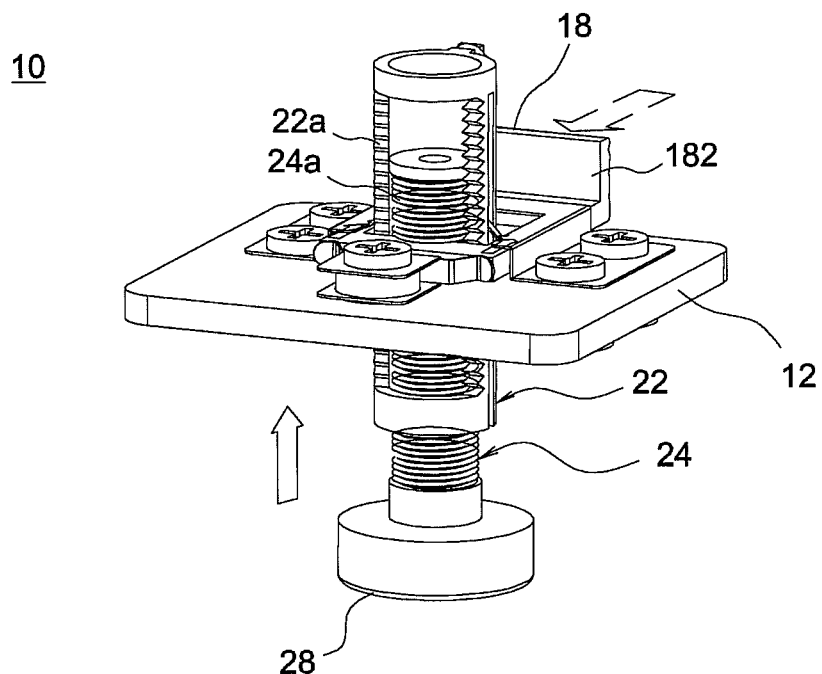
Figure 8:
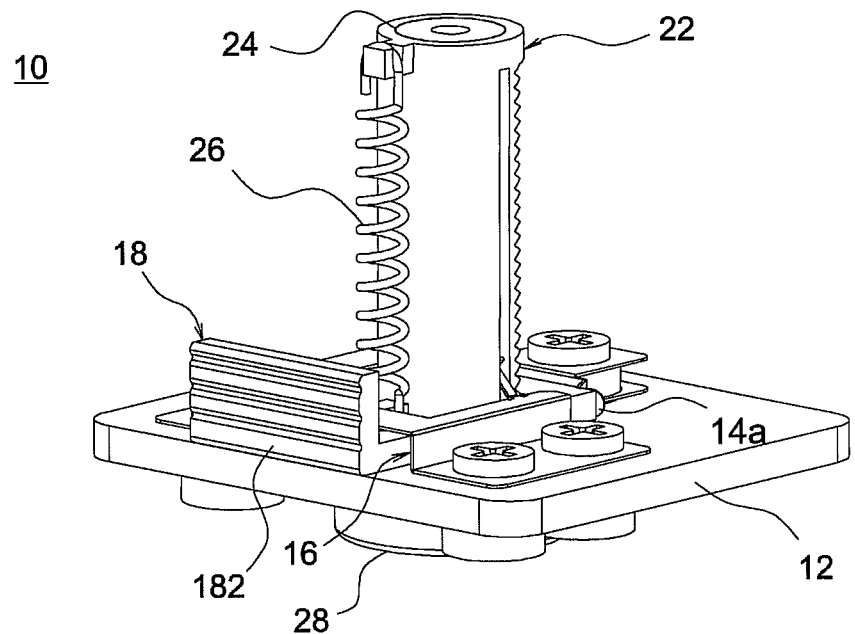

When one stops using the projection apparatus, one may, as shown in FIG. 7, press the force-exertion part 182 of the sliding mount 18 to push the entire sliding mount 18, and thus the screw stud 24 and screw stud sleeve 22 are allowed to return to their original positions shown in FIG. 8. Therefore, the operation for storing the elevating mechanism 10 inside a projection apparatus is quite simple and convenient.

Note the spring 26 and the elastic sheet 14a in the above embodiments are merely illustrated as an example, and other component capable of providing elastic force may be also used in the above embodiments. Further, in one embodiment, a part of a housing of a projection apparatus may serve as the bottom cover 12.

The embodiment or the embodiments of the invention may have at least one of the following advantages. According to the above embodiments, the sliding mount cooperates with the resetting element to enable the screw stud sleeve and the screw stud to rapidly reach a preliminary position, and then the height of a front end of a projection apparatus is accurately and rapidly adjusted through the fine tune of the rotatable foot pad. Besides, when one stops using the projection apparatus, one may simply presses the sliding mount to force the screw stud and the screw stud sleeve to return to their original positions. Therefore, the operation for storing the elevating mechanism inside the projection apparatus is quite simple and convenient. Further, the decelerating element may continually rub against the screw stud sleeve to reduce the falling speed of the screw stud and the screw stud sleeve and thus smooth the release of the elevating mechanism.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Each of the terms "first" and "second" is only a nomenclature used to modify its corresponding element. These terms are not used to set up the upper limit or lower limit of the number of elements, wherein the element is, for example, an elastic member.

What is claimed is:

1. An elevating mechanism for a projection apparatus, comprising:
    a bottom cover having a through hole;
    a resetting element disposed on a first side of the bottom cover, wherein at least one first elastic member is formed on one end of the resetting element;
    a sliding mount disposed on the first side of the bottom cover and leaning against the resetting element, and the sliding mount having an opening, at least one slot and a thread structure;
    a screw stud sleeve inserted into the through hole and the opening, and slidably coupled to the bottom cover, and the screw stud sleeve having a plurality of engaging teeth engaging with the slot;
    a screw stud accommodated in the screw stud sleeve and having a thread structure, wherein the thread structure of the screw stud meshes with the thread structure of the sliding mount; and
    a second elastic member, one end of the second elastic member being connected with the screw stud sleeve, and another end of the second elastic member being connected with the bottom cover, wherein, when the sliding mount is forced to compress the first elastic member, the engaging teeth come off the slot and the thread structure of the screw stud comes off the thread structure of the sliding mount to enable the screw stud and the screw stud sleeve to move in a first direction; and
    an elastic sheet disposed on the first side of the bottom cover and capable of rubbing against the screw stud sleeve to adjust the speed of the screw stud and the screw stud sleeve moving in the first direction.

2. The elevating mechanism for a projection apparatus as claimed in claim 1, wherein the first direction is the direction of gravity.

3. The elevating mechanism for a projection apparatus as claimed in claim 1, further comprising:
    a rotatable foot pad fixed to one end of the screw stud, wherein the rotatable foot pad is rotated relative the bottom cover to enable the screw stud and the screw stud sleeve to move in the first direction or a second direction opposite the first direction.

4. The elevating mechanism for a projection apparatus as claimed in claim 1, wherein the first elastic member comprises an elastic sheet.

5. The elevating mechanism for a projection apparatus as claimed in claim 1, wherein the second elastic member comprises a spring.

6. The elevating mechanism for a projection apparatus as claimed in claim 5, wherein the screw stud sleeve has at least one first hook structure, the bottom cover has at least one second hook structure, one end of the spring is connected with the first hook structure, and another end of the spring is connected with the second hook structure.

7. The elevating mechanism for a projection apparatus as claimed in claim 1, wherein the sliding mount has a base part and a force-exertion part, the slot, the thread structure and the opening of the sliding mount are formed on the base part, and the force-exertion part forms an angle with the base part.

8. The elevating mechanism for a projection apparatus as claimed in claim 1, wherein the slot and the thread structure of the sliding mount are formed on a periphery of the opening.

* * * * *